(12) United States Patent
Cunningham et al.

(10) Patent No.: US 7,481,379 B2
(45) Date of Patent: Jan. 27, 2009

(54) FUEL COMBUSTION CATALYST DELIVERY APPARATUS

(75) Inventors: Emmett Manuel Cunningham, Phoenix, AZ (US); George M. Malouf, Irvine, CA (US); Russ Webster, Wilcox, AZ (US)

(73) Assignee: Emissions Technology, Inc., Phoenix, AZ (US)

( * ) Notice: Subject to any disclaimer, the term of this patent is extended or adjusted under 35 U.S.C. 154(b) by 160 days.

(21) Appl. No.: 11/295,426

(22) Filed: Dec. 5, 2005

(65) Prior Publication Data

US 2006/0102743 A1    May 18, 2006

Related U.S. Application Data

(63) Continuation-in-part of application No. 11/269,376, filed on Nov. 7, 2005.

(60) Provisional application No. 60/634,095, filed on Dec. 8, 2004, provisional application No. 60/625,769, filed on Nov. 8, 2004, provisional application No. 60/634,095, filed on Dec. 8, 2004.

(51) Int. Cl.
| | |
|---|---|
| *B05B 1/08* | (2006.01) |
| *B05B 3/04* | (2006.01) |
| *F02B 47/02* | (2006.01) |
| *F02B 47/04* | (2006.01) |
| *F02B 51/02* | (2006.01) |

(52) U.S. Cl. .................. 239/102.2; 239/101; 239/326; 239/338; 123/25 E; 123/670

(58) Field of Classification Search ............... 239/338, 239/102.2, 326, 101, 76, 102.1, 302, 337, 239/340, 341, 346, 350, 369, 370, 533.1; 123/25 E, 670, 198 A, 272, 498, 536; 431/4, 431/190
See application file for complete search history.

(56) References Cited

U.S. PATENT DOCUMENTS

| | | | |
|---|---|---|---|
| 1,989,113 A | 1/1935 | Rector | ..................... 123/1 A |
| 2,460,700 A | 2/1949 | Lyons | ..................... 123/1 A |

(Continued)

FOREIGN PATENT DOCUMENTS

| | | |
|---|---|---|
| EP | 0006687 | 1/1980 |
| GB | 2398521 | 12/2005 |

OTHER PUBLICATIONS

International Search Report for PCT/US2005/043947 dated Jun. 1, 2007.
International Preliminary Report on Patentability for PCT/US2005/043947 dated Jun. 19, 2007.
Written Opinion of the International Searching Authority for PCT/US2005/043947 dated Jun. 1, 2007.

*Primary Examiner*—Darren W Gorman
(74) *Attorney, Agent, or Firm*—Fennemore Craig, P.C.

(57) ABSTRACT

Efficient and effective fuel combustion catalyst delivery apparatus is disclosed. A fuel combustion catalyst delivery apparatus may include a receptacle containing a material such as a liquid. The liquid may include one or more catalytic materials. The apparatus may further include a vibration pump configured to convert the liquid to an aerosol to be delivered into an intake air of a combustion zone, a pressure equalizer configured to maintain the pressure level of the receptacle at about the same pressure level as that of the intake air of the combustion zone, and a liquid delivery device configured to deliver the liquid to the vibration pump. The apparatus may further include an electronic control module and a mounting bracket or a docking station. The electronic control module may be used to control the vibration pump. The apparatus may further include a pressure sensor for sensing the pressure level of the intake air of the combustion zone so that the vibration pump can regulate the delivery rate of the liquid into the intake air as the aerosol based on the pressure level of the intake air. The vibration pump may be also configured to regulate the delivery rate of the liquid into the intake air as the aerosol, based on an actual fuel consumption rate in the combustion zone.

45 Claims, 6 Drawing Sheets

U.S. PATENT DOCUMENTS

| | | | |
|---|---|---|---|
| 3,790,139 A | 2/1974 | Stephenson et al. | 261/18.2 |
| 3,856,901 A | 12/1974 | Neumann et al. | 261/18.2 |
| 3,875,922 A | 4/1975 | Kirmss, Jr. | 123/198 A |
| 4,076,002 A | 2/1978 | Mellqvist et al. | 123/198 A |
| 4,157,316 A | 6/1979 | Thompson et al. | 502/304 |
| 4,170,960 A | 10/1979 | Germack et al. | 123/198 A |
| 4,295,816 A | 10/1981 | Robinson | 431/4 |
| 4,362,130 A | 12/1982 | Robinson | 123/1 A |
| 4,382,017 A | 5/1983 | Robinson et al. | 502/169 |
| 4,440,874 A | 4/1984 | Thompson | 502/327 |
| 4,475,483 A | 10/1984 | Robinson | 123/1 A |
| 5,085,841 A | 2/1992 | Robinson | 423/213.5 |
| 5,525,316 A | 6/1996 | Shustorovich et al. | 423/213.5 |
| 5,851,498 A | 12/1998 | Rozenshtein et al. | 422/211 |
| 5,968,464 A | 10/1999 | Peter-Hoblyn et al. | 423/235 |
| 6,176,701 B1 | 1/2001 | Robinson | 431/4 |
| 6,296,196 B1 | 10/2001 | Denen et al. | |
| 6,419,477 B1 | 7/2002 | Robinson | 431/4 |
| 6,446,880 B1 | 9/2002 | Schram et al. | |
| 6,602,067 B1 | 8/2003 | Robinson | 431/4 |
| 6,766,817 B2 | 7/2004 | da Silva | |
| 6,776,606 B2 | 8/2004 | Haskew | 431/2 |
| 6,786,714 B2 | 9/2004 | Haskew | 131/4 |
| 2002/0150514 A1 * | 10/2002 | Haskew | 422/145 |
| 2002/0165088 A1 | 11/2002 | Haskew | 502/172 |
| 2003/0234012 A1 | 12/2003 | Bosteels | 123/670 |
| 2004/0255874 A1 | 12/2004 | Haskew et al. | 123/536 |
| 2005/0053875 A1 | 3/2005 | Haskew | 431/4 |
| 2005/0054522 A1 | 3/2005 | Haskew | 502/230 |

* cited by examiner

FUEL COMBUSTION CATALYST DELIVERY APPARATUS

CROSS-REFERENCES TO RELATED APPLICATIONS

This is a continuation-in-part of U.S. patent application Ser. No. 11/269,376 entitled "FUEL COMBUSTION CATALYST MICROBURST AEROSOL DELIVERY DEVICE AND CONTINUOUS AND CONSISTENT AEROSOL DELIVERY DEVICE," filed on Nov. 7, 2005, which claims the benefit of priority under 35 U.S.C. §119 from U.S. Provisional Patent Application Ser. No. 60/625,769 entitled "FUEL CATALYST SYSTEM WITH MICRO BURST PUMP," filed on Nov. 8, 2004 and U.S. Provisional Patent Application Ser. No. 60/634,095 entitled "FUEL CATALYST MICRO BURST PUMP MECHANISM," filed on Dec. 8, 2004, all of which are hereby incorporated by reference in their entirety for all purposes.

FIELD OF THE INVENTION

The present invention generally relates to a fuel combustion catalyst and an aerosol delivery device and, more particularly, relates to a fuel combustion catalyst delivery apparatus.

BACKGROUND OF THE INVENTION

Internal combustion engines are the major fuel consuming products and the most significant contributor to air pollution. They consume more than 25% of total United States energy and 70% of total petroleum. Internal combustion engine pollutants have local, regional and global impacts. Fuel consumption and internal combustion engine pollution impose a variety of health, economic, and environmental costs on society. Internal combustion engines are used in motor vehicles, other types of vehicles (e.g., boats and airplanes) and industrial equipment, all of which consume fuel and produce pollution. In addition, the combustion of carbon-based fuels produces carbon dioxide, a so-called "green house gas." This has been implicated in global warming.

Accordingly, a need exists for a device that can reduce fuel consumption, pollutants and carbon dioxide emissions. A need also exists to reduce carbon build-up and soot ingestion into the oil of an engine and to extend the engine and combustion chamber life. A need also exists for a device that can deliver the proper amount of aerosol continuously over an extended period.

SUMMARY OF THE INVENTION

According to one aspect of the present invention, the method and system of the present invention offer a solution to the ever growing environmental and economic problems caused by the combustion of any fuel while enhancing the fuel economy of any given combustion technique. Introducing metered catalytic materials, by means of a fuel catalyst microburst disc pump device, into the fuel combustion zone increases the performance and efficiency of the combustion process. Introducing the correct amount of catalytic materials into the flame zone with the proper ratio of fuel to oxygen provides a measurable rate of success.

According to one aspect, the present invention can reduce fuel consumption, exhaust emissions and pollutants, and carbon build-up and soot ingestion into the oil of an engine, extend engine and combustion chamber life due to less wear on the components, and decrease preventive maintenance cycles for oil and filter replacements. There are numerous ways to introduce catalytic materials into the combustion zone, for example, by adding them to the fuel, but improved performance and efficiency can be achieved by introducing the catalytic materials into the intake air of the combustion zone. Adding the catalytic materials into the intake air enables more complete atomization of the catalytic materials as compared to the other methods of introducing the catalytic materials, for example, with the fuel. Furthermore, adding the catalytic materials to the intake air enables more intimate contact of the catalytic materials with the oxygen component of the combustion reaction.

According to one embodiment of the present invention, a fuel combustion catalyst delivery apparatus includes a receptacle containing a material. The material may include one or more catalytic materials. The receptacle includes surfaces exposed to the material, and the receptacle is for coupling to or coupled to an injection nebulizer. The injection nebulizer is configured to convert the material to an aerosol and to inject the aerosol into an intake air of a combustion zone. The aerosol may modify combustion, and the injection nebulizer includes surfaces for being exposed to the material or the aerosol. The fuel combustion catalyst delivery apparatus may further include a pressure regulator configured to provide the pressure level of the receptacle about equal to the pressure level of the intake air regardless of the pressure level of the intake air.

According to another embodiment, a fuel combustion catalyst delivery apparatus includes a receptacle containing a liquid, a vibration pump configured to convert the liquid to an aerosol to be delivered into an intake air of a combustion zone, a pressure equalizer configured to maintain the pressure level of the receptacle at about the same pressure level as that of the intake air of the combustion zone, and a liquid delivery device configured to deliver the liquid to the vibration pump. The liquid may include one or more catalytic materials.

According to yet another embodiment, a fuel combustion catalyst delivery apparatus includes a receptacle containing a material. The material may include one or more catalytic materials. The receptacle is for coupling to or coupled to a nebulizer. The nebulizer is configured to convert the material to an aerosol to be delivered into an intake air of a combustion zone, and the nebulizer is configured to control the amount of the aerosol being delivered into the intake air. The fuel combustion catalyst delivery apparatus further includes a regulator to allow the aerosol to be delivered into the intake air of the combustion zone regardless of the pressure level of the intake air.

Additional features and advantages of the invention will be set forth in the description below, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be obvious, however, to one ordinarily skilled in the art that the present invention may be practiced without some of these specific details. In other instances, well-known structures and techniques have not been shown in detail not to obscure the present invention.

Figure 1:
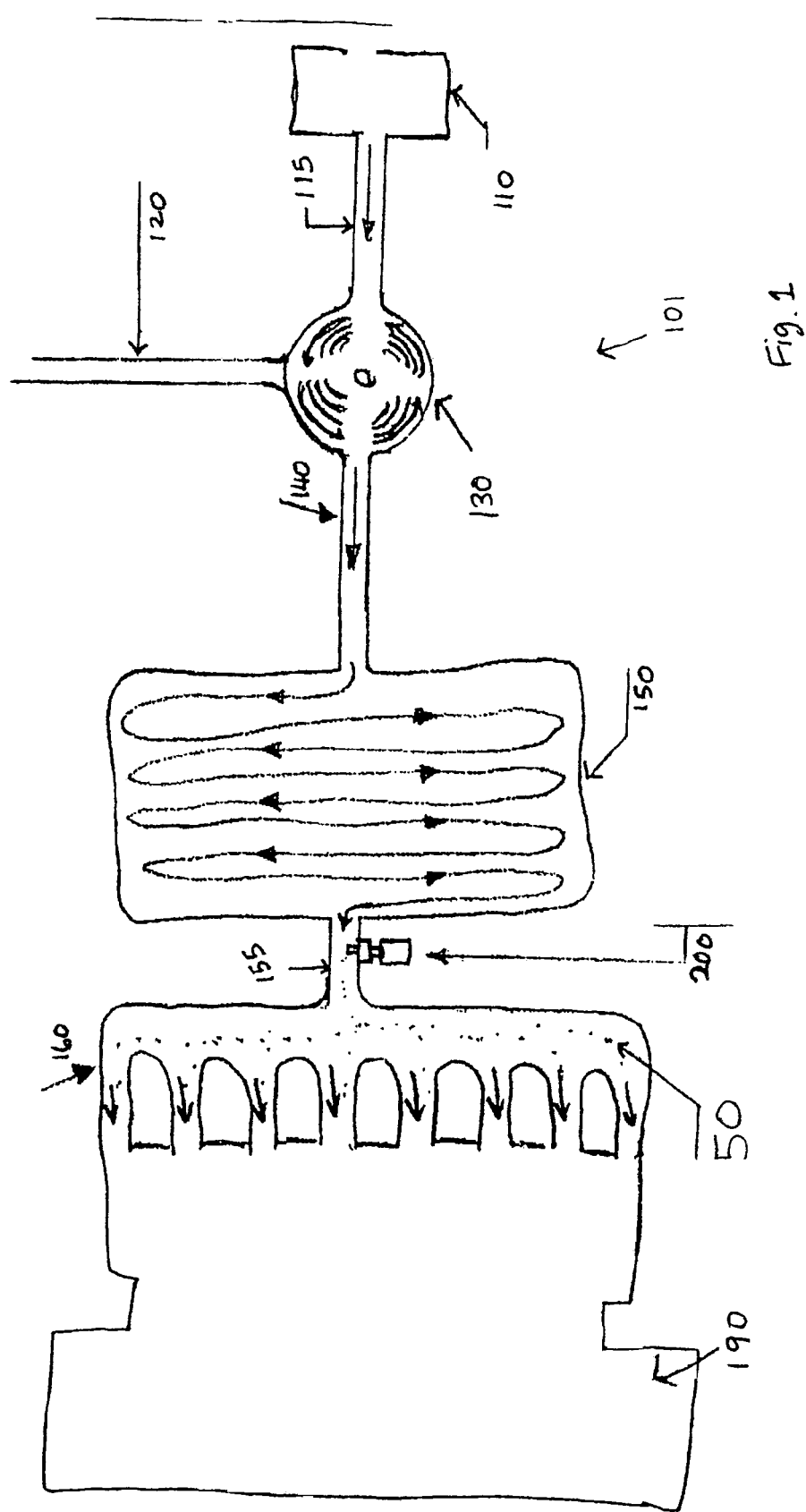
FIG. 1 illustrates a fuel combustion catalyst delivery device placed in an engine compartment in accordance with one embodiment of the present invention.

Now referring to FIG. 1, certain components of an engine compartment and a fuel combustion catalyst delivery device are illustrated according to one embodiment of the present invention. An engine compartment 101 may include, among others, an air filter 110, a pre-turbo air duct 115, a turbo charger or supercharger 130, an exhaust-out duct 120, a post-turbo air duct 140, a combustion air cooler 150, a post air cooler duct 155, an engine air intake manifold 160 and a combustion chamber 190. According to one aspect, an air intake duct, which is a path for an intake air, may include the pre-turbo air duct 115, the post-turbo air duct 140, the post air cooler duct 155 and the engine air intake manifold 160.

According to one aspect of the present invention, the pressure level of the intake air in the pre-turbo air duct 115 may vary from below the atmospheric pressure level (e.g., vacuum) to the atmospheric pressure level. The pressure level of the intake air after the turbo charger or supercharger 130 (e.g., post-turbo air duct 140, the post air cooler duct 155 and the engine air intake manifold 160) may vary from below the atmospheric pressure level (e.g., vacuum) to the atmospheric pressure level and further to above the atmospheric pressure level (e.g., up to 50 psi; however, the invention is not limited to 50 psi). When an engine is on, and the turbo charger or supercharger 130 is off, the pressure level of the intake air after the turbo charger or supercharger 130 may be below the atmospheric pressure level (e.g., vacuum). When the engine is on, and the turbo charger or supercharger 130 is on, the pressure level of the intake air after the turbo charger or supercharger 130 may be above the atmospheric pressure level (i.e., the intake air is pressurized). When the engine is off, the pressure level of the intake air after the turbo charger or supercharger 130 may be at the atmospheric pressure level.

According to one embodiment of the present invention, a fuel combustion catalyst delivery device 200 that can provide air born fuel combustion catalytic materials may be located anywhere in the air intake duct. According to one aspect, the present invention allows the fuel combustion catalyst delivery device 200 to be placed after the turbo charger or supercharger 130, such as in the area of the post-turbo air duct 140 or the post air cooler duct 155 (as shown in FIG. 1). Placing the fuel combustion catalyst delivery device 200 closer to the combustion chamber 190 eliminates not only the perilous path but also the contamination of the catalytic materials and the probability of some of the catalytic materials being trapped in the process, reducing the overall benefits. According to another aspect, the fuel combustion catalyst delivery device 200 can be placed before the turbo charger or supercharger 130, such as in the area of the pre-turbo air duct 115.

A fuel combustion catalyst delivery device of the present invention can be utilized with any combustion including, without limitation, combustions occurring in internal combustion engines, turbines, boilers, furnaces and any other open or closed flame applications. Fuel types applicable to this present invention may be derived from hydrogen, coal, petroleum (e.g., gasoline, diesel and jet fuel), natural gas, alternative fuel or biological sources. According to one embodiment of the present invention, a fuel combustion catalyst delivery device may deliver catalytic materials into an intake air of any combustion zone and is not limited to an intake air of an engine combustion chamber. According to another aspect, a fuel combustion catalyst delivery device may be placed in an after-filtered intake air of a naturally aspirated combustion zone.

Figure 2:
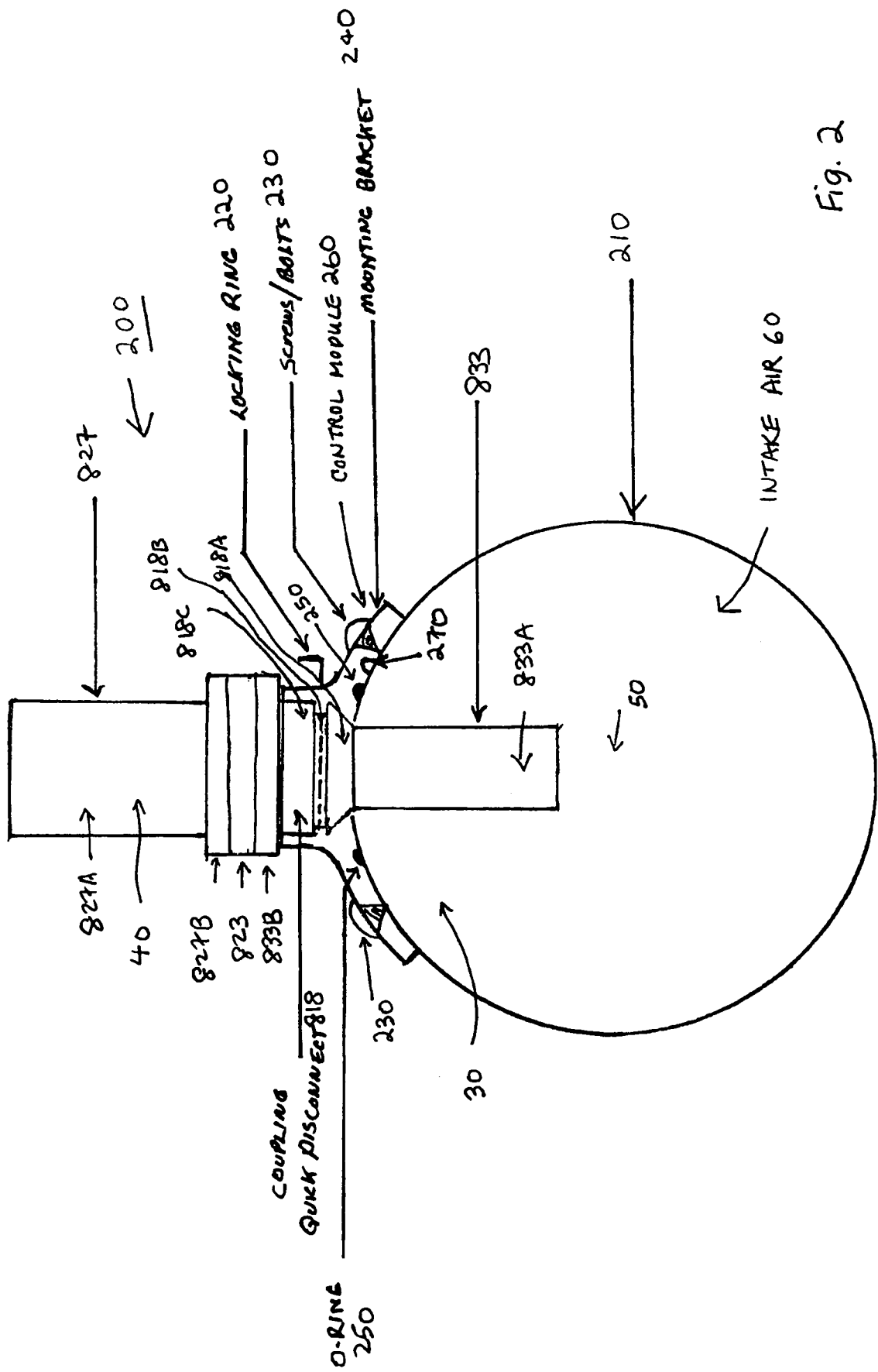
FIG. 2 is a fuel combustion catalyst delivery device mounted onto an air intake duct in accordance with one embodiment of the present invention.

Now referring to FIG. 2, a fuel combustion catalyst delivery device mounted onto an air intake duct is illustrated in accordance with one embodiment of the present invention. A fuel combustion catalyst delivery device 200 may include a receptacle 827 containing a material 40, an injection nebulizer 30 and an assembly guide plate 823.

According to one embodiment, the receptacle 827 includes a main body portion 827A and a receptacle assembly ring 827B. The injection nebulizer 30 includes a chamber 833, which includes a main body portion 833A, a coupling quick disconnect 818, and a base 833B. The coupling quick disconnect 818 includes a first outer portion 818A, a recessed portion 818B and a second outer portion 818C. According to one aspect, the assembly guide plate 823 may be considered as a part of the receptacle 827, as a part of the injection nebulizer 30, as a part of both the receptacle 827 and the injection nebulizer 30, or as a unit separate from the receptacle 827 and the injection nebulizer 30.

Figure 4:
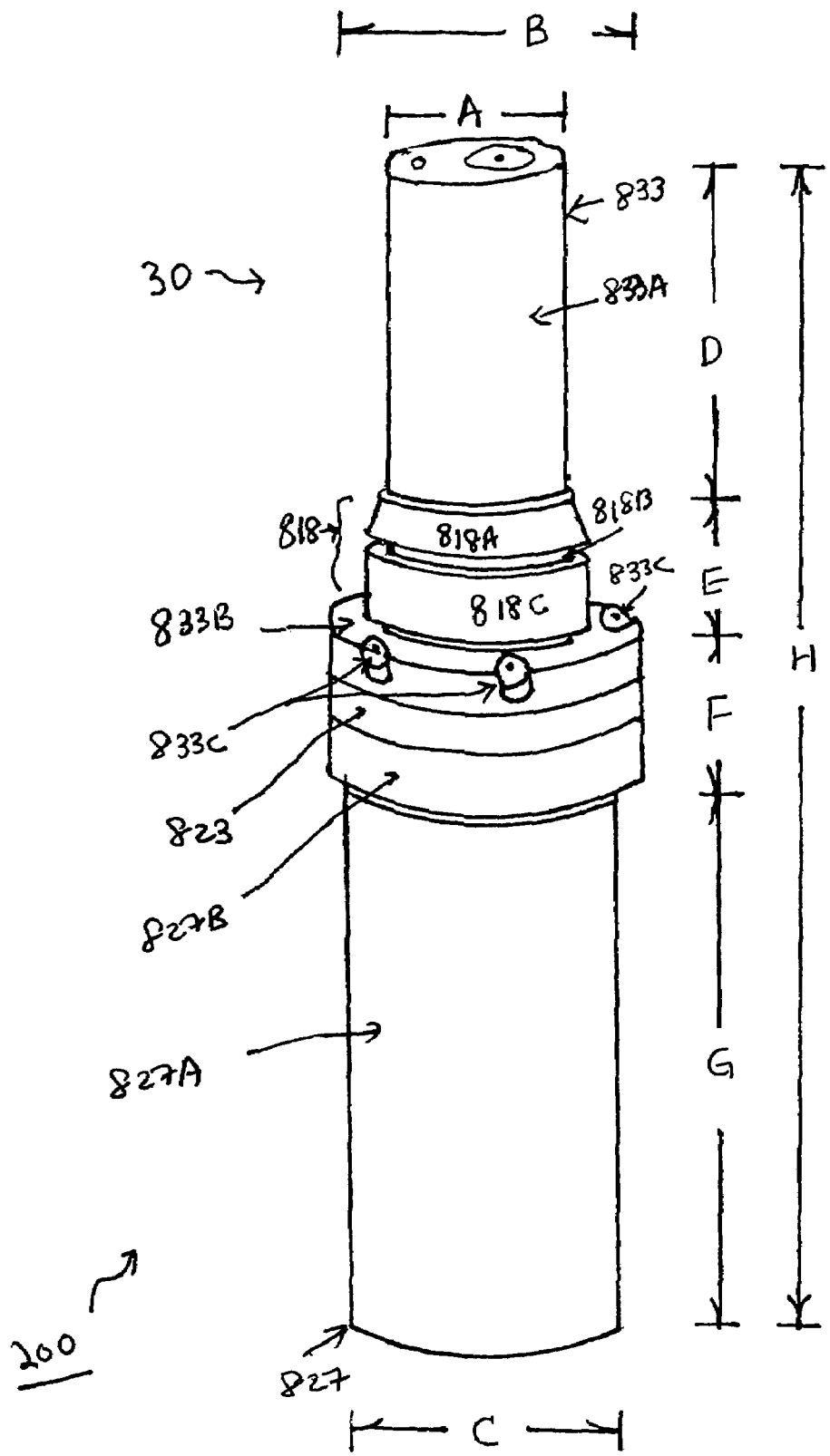
FIG. 4 illustrates an assembled fuel combustion catalyst delivery device in accordance with one embodiment of the present invention.

According to one embodiment, the receptacle 827 is coupled to the injection nebulizer 30, for example, via the assembly guide plate 823. In another embodiment, the receptacle 827 and the injection nebulizer 30 may exist as separate units, for example, during shipping and handling, and then they are assembled together as shown in FIG. 2 or FIG. 4 for operation.

According to one embodiment, the material 40 contained in the receptacle 827 may be any liquid including, without limitation, water, alcohol, kerosene, oil, glycol, organic acid, ester or some combination thereof. According to one aspect, such liquid may be used as a carrier. According to another aspect, such liquid may be acidic (for example and without limitation pH 2-4). According to another embodiment, the material 40 may include solid materials such as powdered materials. According to one embodiment, the material 40 may include one or more of catalytic materials or inert materials (e.g., non-catalytic materials) or some combination thereof.

Catalytic materials, which may be used as a fuel combustion catalyst, may include, without limitation, catalytic metals. Catalytic metals may include, without limitation, platinum, rhodium, rhenium, palladium, ruthenium, iridium, gold, aluminum, iron, molybdenum, cerium and tin and compounds thereof. Inert materials may include, without limitation, lithium, sodium, potassium, calcium and magnesium and compounds thereof. According to yet another embodiment, the material 40 may include one or more of precious or non-precious metals, compounds thereof or a combination thereof.

Still referring to FIG. 2, according to one embodiment, the fuel combustion catalyst delivery device 200 is mounted onto an air intake duct 210 in a manner that a portion of the fuel combustion catalyst delivery device 200 (e.g., the main body portion 833A) is placed inside the air intake duct 210. A mounting bracket (or a docking station) 240, screws and/or bolts 230 and a locking ring 220 may be used to mount the fuel combustion catalyst delivery device 200 onto the air intake duct 210. By disengaging the locking ring 220 from the coupling quick disconnect 818, the fuel combustion catalyst delivery device 200 can be quickly and easily disconnected from the air intake duct 210. An o-ring 250 is included to provide a seal. The fuel combustion catalyst delivery device 200 may also include a control module 260 (described in detail later), which is provided on the mounting bracket 240. In another embodiment, the control module 260 is not mounted on the mounting bracket 240 and is placed elsewhere.

The injection nebulizer 30 can convert the material 40 to an aerosol 50 and inject the aerosol 50 directly into an intake air 60 in the air intake duct 210 of a combustion zone, where the aerosol 50 can accelerate or modify combustion, and a high catalytic effect can be achieved on the combustion of fuel. The intake air 60 may be an intake air of an air intake duct (as described above) or an intake air of any combustion zone (as described above). By controlling the catalytic consistency, the size of the aerosol particles and the frequency at which the aerosol particles are delivered, the catalytic materials in the aerosol can perform at a high level based on the amount and type of fuel it is treating.

According to one aspect, the surfaces of or the surfaces within the receptacle 827 and the injection nebulizer 30 that are exposed to or that are to be exposed to the material 40 or the aerosol 50 are made of materials suitable to be exposed to the material 40 and the aerosol 50.

According to one aspect, the aerosol 50 and the method of the present invention may be used for oxidation and combustion acceleration of any fuel. An aerosol delivery system of the present invention can reduce the amount of fuel consumed, reduce exhaust emissions, reduce the available carbon and soot for intrusion into the oil system (blow-by) of an engine, reduce wear on the components, extend the engine life, reduce oil replacement and consumption and filter replacement (maintenance cycles) and increase horsepower and/or torque.

To maximize the aforementioned benefits, the aerosol 50 containing the catalytic and inert materials is simultaneously introduced into a combustion zone with the intake air, at a point closet to the combustion, in a concentrated form relative to the gallons or weight of fuel being consumed. By delivering a mixture of catalytic and inert materials to the combustion process, the present invention can accelerate the combustion of any fuel and achieve better performance and efficiency than other methods such as delivering a catalyst with the fuel.

Figure 3:
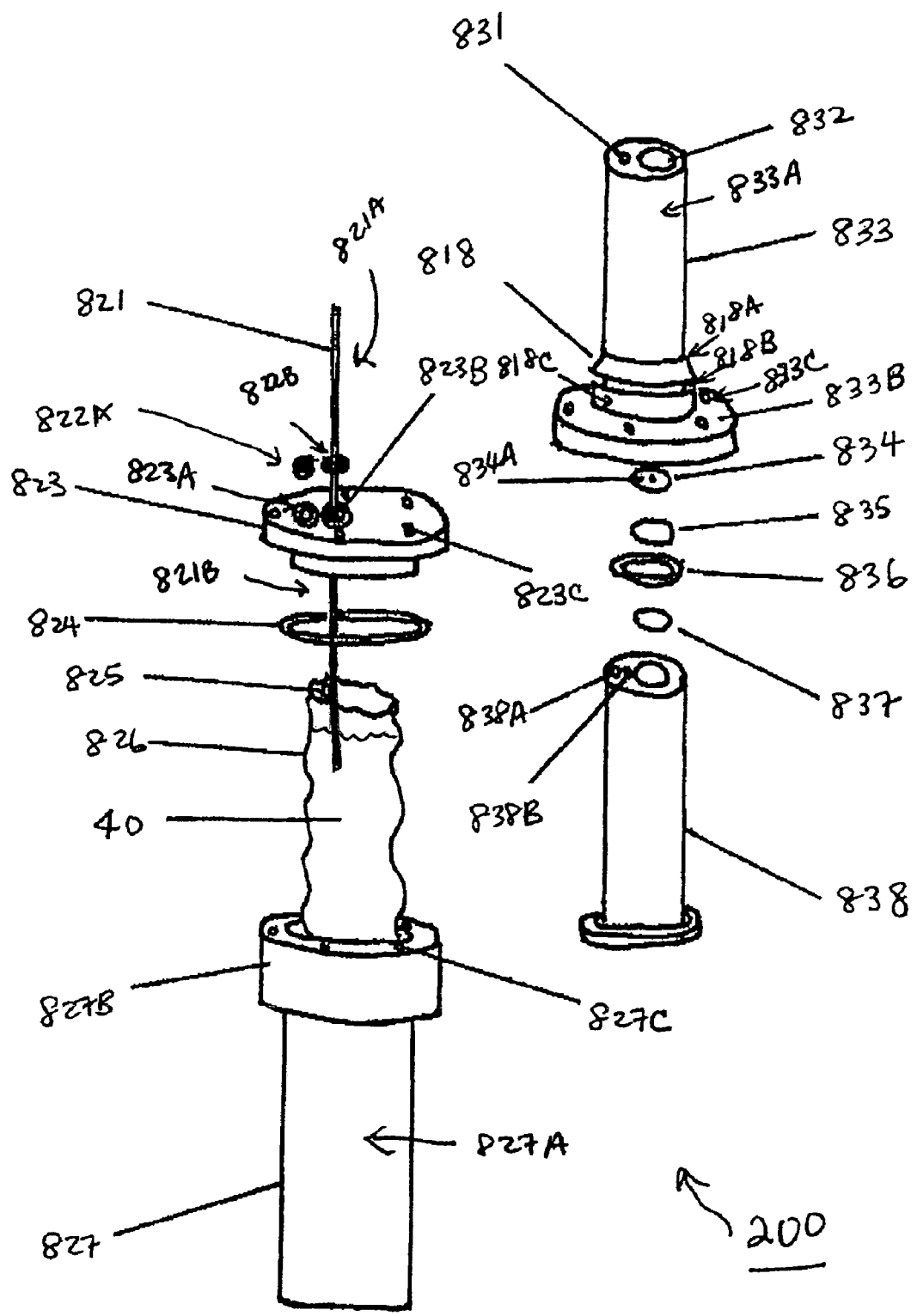
FIG. 3 is an exploded view of components of a fuel combustion catalyst delivery device in accordance with one embodiment of the present invention.

FIG. 3 is an exploded view of components of a fuel combustion catalyst delivery device in accordance with one embodiment of the present invention. The fuel combustion catalyst delivery device 200 may include the following:

a wick 821;
washers 822A and 822B;
the assembly guide plate 823;
a washer 824;
a self-sealing port 825;
a flexible bag 826;
the receptacle 827;
a pressure/vacuum equalization pathway 831;
the chamber 833;
the coupling quick disconnect 818
an injector plate 834;
an orifice 834A;
a diaphragm 835;
a washer 836;
a piezoelectric device 837; and
a guide housing 838.

FIG. 4 illustrates an assembled fuel combustion catalyst delivery device in accordance with one embodiment of the present invention. The same numerical references are used in FIGS. 2, 3 and 4 to show how the components are assembled together.

Referring to FIGS. 2, 3 and 4, according to one embodiment, the injection nebulizer 30 may include the injector plate 834, the diaphragm 835 and the piezoelectric device 837. The injection nebulizer 30 may further include the washer 836, the chamber 833 and the guide housing 838. According to another embodiment, an injection nebulizer may include only some of these components, entirely different components or some combination thereof. According to yet another embodiment, an injection nebulizer may have a shape or structure different from that shown in FIGS. 3 and 4. According to one embodiment, a nebulizer may be an injection nebulizer. According to another embodiment, a nebulizer may be another type of device or mechanism.

The injector plate 834, the diaphragm 835, the washer 836, the piezoelectric device 837 and the guide housing 838 are placed in the chamber 833 so that the injector plate 834 abuts the top inner wall of the chamber 833. The injector plate 834 includes one orifice 834A, and the chamber 833 includes an opening 832 to expose the orifice 834A to outside the chamber 833. In another embodiment, the injector plate 834 may include more than one orifice.

The guide housing 838 is a solid material having passages 838A and 838B. The guide housing 838 is used to place the injector plate 834, the diaphragm 835, the washer 836 and the piezoelectric device 837 to the end of the chamber 833 so that the aerosol 50 can be easily ejected out of the chamber 833 and injected into an intake air. If the length of the main body portion 833A is shortened, then the length of the guide housing 838 can be also shortened.

According to one embodiment, the flexible bag 826 is inserted into the receptacle 827, and the flexible bag 826 contains the material 40. According to one aspect, the flexible bag 826 is collapsible. The washer 824 is placed onto the lower portion of the assembly guide plate 823 so that the material 40 does not leak out. The assembly guide plate 823 is placed on top of the receptacle 827 (as shown in FIG. 4). The assembly guide plate 823 is attached to the receptacle 827 and the chamber 833 using screws/bolts inserted into the assembly screw/bolt holes 833C (e.g., five such holes) of the base 833B, through the assembly screw/bolt holes 823C (e.g., five such holes), and through the assembly screw/bolt holes 827C (e.g., five such holes). The assembly guide plate 823 includes two pathways 823A and 823B.

The wick 821 goes through the pathway 823B, and the washer 822B is used to prevent the material 40 from leaking through the pathway 823B. A first portion 821A of the wick 821 is placed in the passage 838B of the guide housing 838.

The first portion 821A extends into a space formed between the surface of the diaphragm 835 facing the injector plate 834 and the surface of the injector plate 834 facing the diaphragm 835 so that the material 40 can be delivered to the space. If the length of the guide housing 838 is shortened, then the length of the first portion 821A can also be shortened.

A second portion 821B of the wick 821 extends into the flexible bag 826 through the self-sealing port 825 so that the wick 821 can be in contact with the material 40. The self-sealing port 825 allows the material 40 to flow out of the flexible bag 826 only through the wick 821. The wick 821 can be any material and shape (e.g., a tube or a synthetic composite) that can provide capillary action to cause the material 40 to be brought up from the receptacle 827 into the aforementioned space between the diaphragm 835 and the injector plate 834. Because of the washer 836, neither the piezoelectric device 837, any of the electrical connections (not shown) nor any wires (not shown) coupled to the piezoelectric device 837 are exposed to the material 40 brought up into the aforementioned space or the aerosol 50.

The wick 821, the washer 824, the assembly guide plate 823 and other associated components may be considered as part of the receptacle 827, as part of the injection nebulizer 30, as part of both the receptacle 827 and the injection nebulizer 30 or as separate units from the receptacle 827 and the injection nebulizer 30.

In operation, to eject the aerosol 50 (shown in FIG. 2) from the fuel combustion catalyst delivery device 200, the piezoelectric device 837 is turned on and vibrates. The piezoelectric device 837 is a type of electronic device in which when voltage is applied, the device expands or contracts (or vibrates). The wick 821 brings the material 40 into the aforementioned space. The vibration of the piezoelectric device 837 causes the diaphragm 835 to vibrate. This vibrates the material 40 within the aforementioned space. The vibration of the diaphragm 835 and the orifice 834A convert the material 40 into the aerosol 50, and the aerosol 50 is ejected from the orifice 834A and injected into an intake air of a combustion zone. According to one aspect, while the material 40 is found below the injector plate 834, the aerosol 50 is found above the injector plate 834. The orifice 834A allows the aerosol 50 to travel generally in one direction (e.g., into an intake air) rather than flowing in all directions. Accordingly, the direction of the flow of aerosol 50 is controllable.

According to one aspect, the fuel combustion catalyst delivery device 200 can operate properly either right side up as shown in FIG. 3 (e.g., the receptacle 827 is at the bottom and the injection nebulizer 30 is on top) or upside down as shown in FIG. 2 (e.g., the receptacle 827 is on top and the injection nebulizer 30 is at the bottom). According to another aspect, the fuel combustion catalyst delivery device 200 can operate properly even when it is tilted sideways at an angle.

Still referring to FIGS. 2, 3 and 4, according to one embodiment, the fuel combustion catalyst delivery device 200 utilizes a pressure regulator to ensure that the pressure level of the receptacle 827 is the same or about the same as the pressure level of an intake air of a combustion zone regardless of the pressure level of the intake air, as described above (e.g., below the atmospheric pressure level, at the atmospheric pressure level or above the atmospheric pressure level).

According to one embodiment, a pressure regulator may be a passage from one end of the chamber 833 to the other end of the chamber 833 and then to the receptacle 827 (e.g., the pressure/vacuum equalization pathway 831, the passage 838A, the pathway 823A and finally into the receptacle 827). This passage allows an intake air to enter into the receptacle 827. Because the bag 826 is flexible, there is a space provided between the outer surface of the flexible bag 826 and the inner surface of the receptacle 827, and the intake air can enter into that space to equalize the pressure level of the receptacle 827 substantially to the pressure level of the intake air of the combustion zone.

In another embodiment, a passage may not start from one end of the chamber 833. The passage may start from any portion of the chamber 833 that is exposed to the intake air so that the intake air can enter the receptacle 827.

Figure 6:
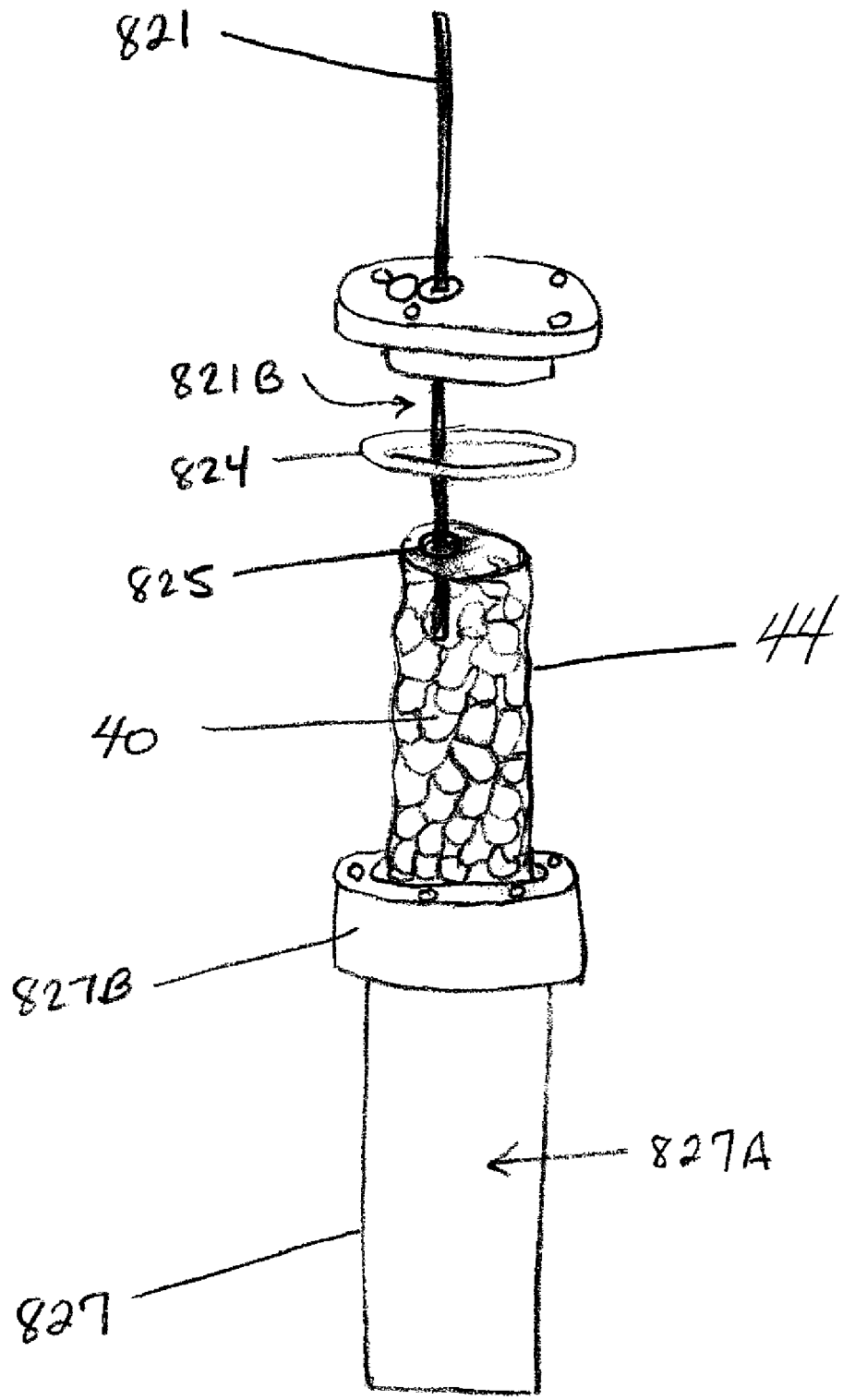
FIG. 6 is an exploded view of certain components of a fuel combustion catalyst delivery device in accordance with one embodiment of the invention.

As shown in FIG. 6, in an alternate embodiment, instead of the flexible bag 826, if a baffling form 44 is used in the receptacle 827 to contain the material 40, then the wick 821 is inserted into the baffling form 44. An air space can be provided in the receptacle 827 so that the baffling form 44 does not occupy the entire receptacle, and the intake air can enter the air space to equalize the pressure level in the receptacle 827 substantially to the pressure level of the intake air. An air baffle may be provided so that the material 40 does not enter this air space.

According to one embodiment, the pressure level of the space formed by the injector plate 834 and the diaphragm 835 is maintained at the same or about the same level as the pressure level of the intake air regardless of the pressure level of the intake air.

According to another embodiment, other types of pressure regulator may be used to maintain the pressure level of the receptacle 827 approximately at the pressure level of an intake air of a combustion zone.

According to one embodiment, a fuel combustion catalyst delivery device of the present invention may include a regulator that can allow an aerosol to eject from the fuel combustion catalyst delivery device and inject into an intake air of a combustion zone regardless of the pressure level of the intake air (e.g., below the atmospheric pressure level, at the atmospheric pressure level or above the atmospheric pressure level). For example, even when the pressure level of the intake air increases above the atmospheric pressure level, the fuel combustion catalyst delivery device of the present invention can still eject an aerosol and inject the aerosol into the intake air. According to one embodiment, such a regulator is a pressure regulator. According to another embodiment, such a regulator may be another type of device or mechanism.

According to one embodiment, the fuel combustion catalyst delivery device 200 of the present invention is configured to prevent the material 40 from leaking out of the fuel combustion catalyst delivery device 200 when the injection nebulizer 30 is turned off regardless of the pressure level of the intake air.

According to another embodiment, the fuel combustion catalyst delivery device 200 is configured to prevent the material 40 from flowing back into the receptacle 827 regardless of the pressure level of the intake air.

According to one aspect, a vibration pump may include the injector plate 834, the diaphragm 835 and the piezoelectric device 837. According to another aspect, a vibration pump may further include the washer 836. According to yet another aspect, a vibration pump may further include the chamber 833, the guide housing 838 and other associated components. According to another aspect, a vibration pump may include only some of the components listed above, entirely different components or some combination thereof. According to yet another embodiment, a vibration pump may have a shape or structure different from that shown in FIGS. 3 and 4.

According to one aspect, a pressure equalizer may include a pressure regulator or another type of regulator, device or mechanism. According to one aspect, a liquid delivery device may include a wick such as the wick 821. According to another aspect, a liquid delivery device may include another type of device or mechanism that can deliver the material 40 to a vibration pump. According to one aspect, a bag or a container may be considered as a receptacle.

According to one aspect, a vibration pump is configured to regulate the delivery rate of the material 40 into an intake air as the aerosol 50 based on the pressure level of the intake air. According to another aspect, a vibration pump is configured to regulate the delivery rate of the material 40 into the intake air as the aerosol 50, based on an actual fuel consumption rate in the combustion zone. According to another aspect, a pressure sensor is provided to sense the pressure level of the intake air of the combustion zone so that the vibration pump can regulate the delivery rate of the material 40 into the intake air as the aerosol 50 based on the pressure level of the intake air.

According to one aspect, a pressure regulator may be a part of a receptacle, a part of an injection nebulizer, a part of both a receptacle and an injection nebulizer, or a separate component. According to one aspect, a pressure equalizer may be a part of a receptacle, a part of a vibration pump, a part of both a receptacle and a vibration pump, or a separate component. According to one aspect, a regulator may be considered a part of a receptacle, a part of a nebulizer, a part of both a receptacle and a nebulizer, or a separate component.

Referring to FIG. 4, according to one embodiment, the fuel combustion catalyst delivery device 200 has the following general dimensions, but the present invention is not limited to these dimensions. The diameter A of the chamber 833 may be about 1 inch. The diameter B of each of the base 833B, the assembly guide plate 823 and the receptacle assembly ring 827B is about 1.8 inches. The diameter C of the main body portion 827A is about 1.5 inches. The length D of the main body portion 833A is about 1.5 inches. The length E of the coupling quick disconnect 818 is about 0.6 inches. The length F of the base 833B, the assembly guide plate 823 and the receptacle assembly ring 827B is about 1.1 inches. The length G of the main body portion 827A is about 2.9 inches. The entire length H of the fuel combustion catalyst delivery device 200 is about 6 inches. According to one embodiment, the length D may be placed within an intake air. According to another embodiment, only a portion of the length D is placed within an intake air. According to yet another embodiment, any length of the length H may be placed within an intake air.

Now referring to FIGS. 2 through 4, according to one aspect, all of the components of and surfaces of and surfaces within the fuel combustion catalyst delivery device 200 (including the receptacle 827 and the injection nebulizer 30) that are substantially exposed to, or that are to be exposed to, the material 40, the aerosol 50 or the fuel may be made from a corrosion-resistant or inert material(s). According to another aspect, all of the components and surfaces of or surfaces within the fuel combustion catalyst delivery device 200 (including the receptacle 827 and the injection nebulizer 30) that are substantially exposed to, or that are to be exposed to, the material 40 or the aerosol 50 may be made from materials that produce substantially no contaminants into the material 40 or the aerosol 50.

To provide corrosion-resistant or inert components or components that produce substantially no contaminants, materials including without limitation a polymer (for example and without limitation plastic and rubber) and ceramic may be used according to one embodiment. For metal components, corrosion-resistant metals including without limitation a nickel-based alloy such as Inconel® 625, an iron-based alloy such as stainless steel, some combination thereof or metals plated with a corrosion-resistant metal such as gold or platinum may be used. According to one embodiment, electrical connections and wires are not exposed to the material 40 or the aerosol 50, so they do not need to be corrosion-resistant or non-contaminant producing, but in another embodiment, if they are exposed to, or to be exposed to, the material 40 or the aerosol 50, then such electrical connections and wires can be coated with an inert and non-contaminant inducing material(s) such as a polymer (for example and without limitation plastic, rubber or Teflon®).

According to one embodiment, all of the components of and surfaces of, surfaces within, and outside surfaces of the fuel combustion catalyst delivery device 200 (including the receptacle 827 and the injection nebulizer 30) that are substantially exposed to, or that are to be exposed to, a fuel or fuel fume may be made from one or more materials inert to the fuel and fuel fume. According to one aspect, the components such as the chamber 833 (including the pressure/vacuum equalization pathway 831), the guide housing 838 (including the passage 838A), the assembly guide plate 823 and the receptacle 827 may be exposed to a fuel or fuel fume.

According to one embodiment, to provide materials that are inert to fuel and fuel fume, materials including without limitation a polymer(s) may be used. For metal components, corrosion-resistant metals including without limitation a nickel-based alloy such as Inconel® 625, an iron-based alloy such as stainless steel, some combination thereof or metals plated with a corrosion-resistant metal such as gold or platinum may be used. If electrical connections or wires are exposed to, or are configured to be exposed to, a fuel or fuel fume, then such electrical connections and wires can be coated with an inert material(s) such as a polymer(s).

According to one embodiment, to have corrosion-resistant or inert components or components that produce substantially no contaminants, the assembly guide plate 823, the baffling form 44, the flexible bag 826, the guide housing 838 and the receptacle 827 (or at least the surfaces of these components that are exposed to the material 40 or the aerosol 50) may be made from a polymer or polymers.

Furthermore, according to one embodiment, the washers 822A, 822B, 824 and 836 are made from a rubber material or a synthetic rubber material. The wick 821 may be a synthetic material (e.g., a synthetic composite). In another embodiment, the wick 821 may be made from a natural material (e.g., cotton). In yet another embodiment, the wick 821 may be made from any inert material that provides capillary action (e.g., a polymer tube or a corrosion-resistant metal tube). In one aspect, the wick 821 may be any capillary tube or any device that acts as a conduit for the material 40. It should be noted that a breakable glass tube is not preferred because, for example, the fuel combustion catalyst delivery device 200 may be subjected to vibration and/or shock.

According to one embodiment, the diaphragm 835 may be made from any metal including without limitation platinum, gold, a compound thereof or some combination thereof, may be made from any metal including without limitation tin, copper, aluminum, silver, a compound thereof or some combination thereof that is plated with a corrosion-resistant material(s) such as platinum or gold or some combination thereof, or may be made from a metal alloy(s) including without limitation a nickel-based alloy such as Inconel® 625, an iron-based alloy such as stainless steel or some combination thereof.

According to one embodiment, the injector plate 834 is made of glass or sapphire, and the orifice 834A is a smooth circular hole through the entire thickness of the injector plate 834 having substantially no debris or imperfection so that the orifice 834A provides substantially no capillary action and the surface tension is maintained. According to one embodiment, the orifice 834A is not greater than 20 μm in diameter (e.g., 10 μm). According to another embodiment, the orifice 834A has a diameter in the range of 5-100 μm.

The screws/bolts inserted into the assembly screw/bolt holes 833C, 823C and 827C may be made from a polymer(s) or a metal(s) such as stainless steel.

According to one embodiment, the piezoelectric device 837 may be made from ceramic and other material(s). Because none of the piezoelectric device 837, its electrical connections or wires is exposed to the material 40 or the aerosol 50, they only need to be made suitable to be placed, for example, in an engine compartment.

According to another aspect of the present invention, the fuel combustion catalyst delivery device 200, the locking ring 220, the screws/bolts 230, the mounting bracket 240 and the o-ring 250 are made from materials having a softening or deforming point above 200° F., or preferably above about 250° F. For example, the receptacle 827 and the injection nebulizer 30 including all of the components within them are made from materials having a softening or deforming point above 200° F., or preferably above about 250° F. For plastic, there is a variety of high temperature plastic materials available.

According to one embodiment, if the fuel combustion catalyst delivery device 200 and the mounting bracket 240 are placed into an engine compartment, the fuel combustion catalyst delivery device 200 and the mounting bracket 240 may be exposed to −30° F. to 200° F. or potentially higher. Accordingly, all of the components within the fuel combustion catalyst delivery device 200 and the mounting bracket 240 need to be made from materials that can withstand the temperature range.

According to one aspect of the present invention, to deliver the correct amount of the aerosol 50 into a combustion zone, the electronic control frequency of the voltage supplied to the electrodes of the piezoelectric device 837 may be a frequency between one pulse per second to one thousand (1000) pulses per second. The voltage causes the piezoelectric device 837 to vibrate, causing the diaphragm 835 to vibrate. The material 40 is converted into the aerosol 50 and is ejected through the orifice 834A. In other words, the piezoelectric device 837 is turned on at a pulse rate between one pulse per second and one thousand pulses per second to produce the aerosol 50 at a rate between once per second and one thousand times per second.

In another embodiment, the pulse rate may be any rate between ten (10) pulses per second and sixty (60) pulses per second. In other words, the piezoelectric device 837 is turned on at a regular interval, and the regular interval may be any rate between ten (10) pulses per second and sixty (60) pulses per second to produce the aerosol 50 at a regular interval between ten times per second and sixty times per second.

By selecting the appropriate frequency of the pulse (which turns on the piezoelectric device 837), the aerosol 50 can be provided to a combustion zone continuously and consistently. Referring to FIG. 2, while fuel combustion occurs in the combustion zone, the fuel combustion catalyst delivery device 200 of the present invention can provide a continuous and consistent stream of an aerosol 50 into the intake air 60 via the air intake duct 210 of a combustion zone by having the piezoelectric device 837 turned on at a regular interval, without having it turned on continuously or at all times.

The lower the number of pulses per second, the longer the volume of the material 40 can last. For example, depending on the frequency applied to the piezoelectric device 837, the fuel combustion catalyst delivery device 200 may deliver about 10 ml to 500 ml of the material 40 as the aerosol 50 over about 500 hours or more of operation. In another example, the fuel combustion catalyst delivery device 200 may deliver about 40 to 50 ml of the material 40 as the aerosol 50 over about 500 hours of operation (i.e., about 22 to 28 nl per second) using ten (10) to sixty (60) pulses per second. In yet another example, the fuel combustion catalyst delivery 200 may delivery about 50 ml of the material 40 as the aerosol 50 over about 400 hours of operation (i.e., 35 nl per second). In another example, the fuel combustion catalyst delivery 200 may deliver about 100 ml of the material 40 as the aerosol 50 over about 800 to 1000 hours. Depending on the delivery rate of the material 40 as the aerosol 50, it may treat an engine consuming 15 gallons per hour or 7500 gallons of fuel.

According to one embodiment, the present invention may provide two or more different delivery rates, for example, a high rate when the turbo charger or supercharger 130 in FIG. 1 is on, and a low rate when the turbo charger or supercharger 130 is off. According to one aspect, a pressure sensor such as a pressure/vacuum sensor 270 in FIG. 2 coupled to the air intake duct 210 may be used to determine whether the turbo charger or supercharger 130 is on or off. The low rate may be some fraction of the high rate. For example, if the high rate is 50 ml over 500 hours, the low rate may be, for example, 20% (e.g., 50 ml over 2500 hours) or 50% of the high rate (e.g., 50 ml over 1000 hours).

According to yet another aspect of the present invention, the fuel combustion catalyst delivery device 200 may operate for over 100 hours, over 300 hours or over 2000 hours without substantially degrading the components of the fuel combustion catalyst delivery device 200.

According to one aspect, the surfaces of the components of the fuel combustion catalyst delivery device 200 (including without limitation the surfaces of or the surfaces within the receptacle 827 and the injection nebulizer 30) exposed to the material 40 or the aerosol 50 can maintain inertness for over x number of hours of operation of the injection nebulizer 30 where x may be any number between 150 and 2000 or for over y number of hours of exposure to the material 40 or the aerosol 50 where y may be any number between 1000 and 9000.

According to another aspect, the surfaces of the components of the fuel combustion catalyst delivery device 200 (including without limitation the surfaces of or the surfaces within the receptacle 827 and the injection nebulizer 30) exposed to the material 40 or the aerosol 50 are capable of producing substantially no contaminants into the material 40 or the aerosol 50 for over x number of hours of operation of the injection nebulizer 30 where x may be any number between 150 and 2000 or for over y number of hours of exposure to the material 40 or the aerosol 50 where y may be any number between 1000 and 9000.

According to one embodiment, the inner surfaces of or the surfaces within the receptacle 827 are exposed to the material 40. For example, if the flexible bag 826 is used, then the surfaces of or the surfaces within the receptacle 827 that are exposed to the material 40 may include, among others, the inner surfaces of the flexible bag 826. Such surfaces may further include at least a portion of the wick 821, the washer 824 and the assembly guide plate 823, if these are considered as part of the receptacle 827. Alternatively, these may be considered as part of the injection nebulizer 30, as part of both the receptacle 827 and the injection nebulizer 30 or as separate units. If the flexible bag 826 can contain the material 40 without any leak, then the inner surfaces of the receptacle 827 will not be exposed to the material 40. In another embodiment, if the baffling form 44 is used, then the surfaces of or the surfaces within the receptacle 827 that are exposed to the material 40 may include, among others, the surfaces of the baffling form 44 and the inner surfaces of the receptacle 827.

Such surfaces may further include at least a portion of the wick 821, the washer 824 and the assembly guide plate 823, as described above.

Many of the components of the injection nebulizer 30 are exposed to or are for being exposed to the material 40 or the aerosol 50. These may include without limitation the injector plate 834, the diaphragm 835 and the washer 836.

Figure 5:
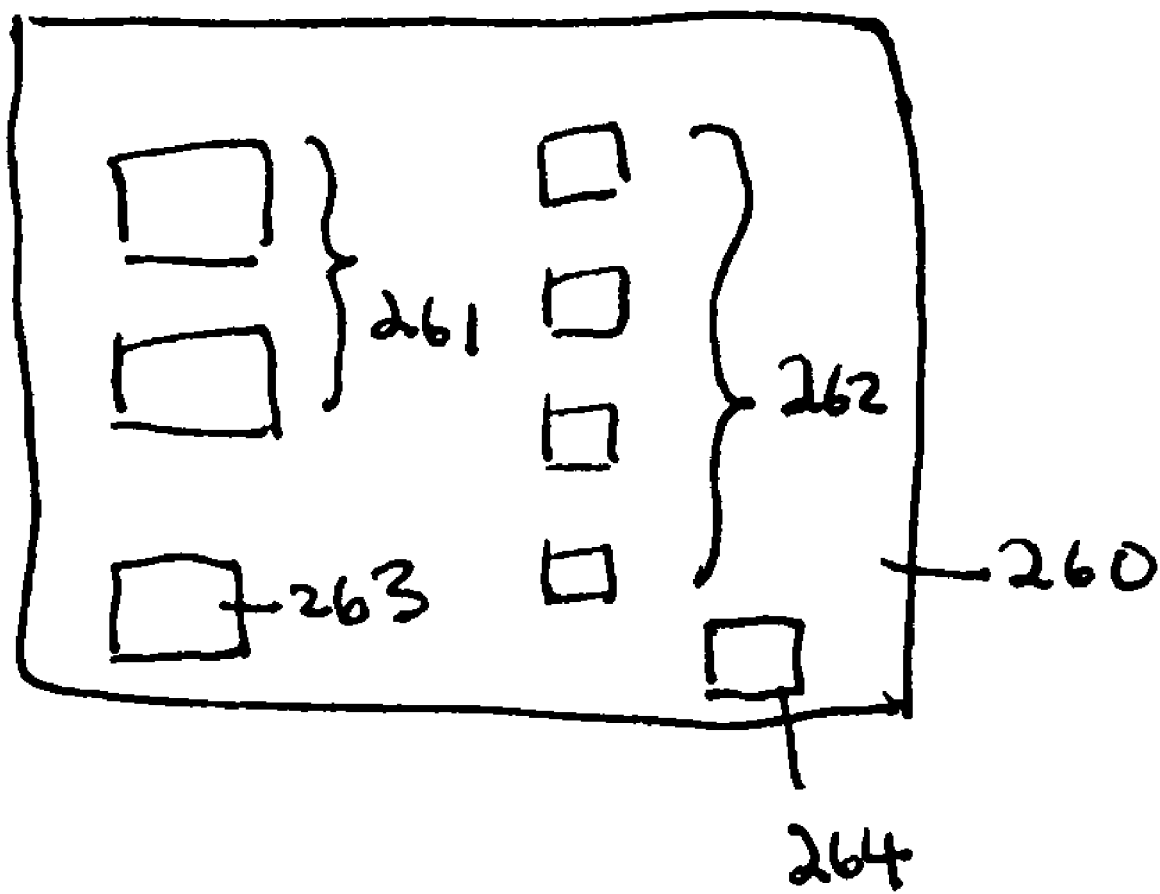
FIG. 5 shows components of a control module of a fuel combustion catalyst delivery device in accordance with one embodiment of the present invention.

FIG. 5 shows components of a control module of a fuel combustion catalyst delivery device in accordance with one embodiment of the present invention. The control module 260 may include, among others, one or more processors 261, one or more memories 262 and a battery 263. The control module 260 may control components such as the piezoelectric device 837 in FIG. 3. According to one aspect, the control module 260 may be considered to be part of the mounting bracket 240 or a separate unit. According to another aspect, the control module 260 may be part of the injection nebulizer 30 or a vibration pump.

According to one embodiment, the components of the fuel combustion catalyst delivery device 200 may be controlled by the control module 260 that is energized by a system it is mounted in/on. For example, if the control module 260 is mounted in an engine compartment, it can use the DC voltage system common to that vehicle or equipment. In another embodiment, the control module 260 may be operated using the battery 263. The battery may be a power source of the fuel combustion catalyst delivery device 200. It may be also used to provide power to retain information and data on the one or more processors 261 and/or the one or more memories 262.

Referring to FIGS. 2 through 5, according to one embodiment, the control module 260 includes a program in the one or more processors 261 that would allow the control module 260 to recognize the various levels of the material 40 remaining in the receptacle 827, for example, by counting the pulses applied to the piezoelectric device 837 (like a fuel gauge). In another embodiment, the control module 260 may provide a replacement-warning signal or a count down signal to indicate when the material 40 is expected to be depleted and a signal indicating the time elapsed since the replacement warning signal has been issued or since the material 40 has been depleted.

In another embodiment, the control module 260 may be equipped with a vibration sensor 264 to control the operational cycles of the injection nebulizer 30 (e.g., turning on or off the injection nebulizer 30). In another embodiment, a vibration sensor may be located elsewhere (e.g., in the mounting bracket 240). For instance, for a vehicle or equipment, which creates vibration while fuel combustion is taking place, the control module 260 can determine when to operate the injection nebulizer 30 by monitoring vibration of the vehicle or the equipment. For example, when the engine of a vehicle runs, the engine produces vibration, and when the control module 260 detects vibration, it keeps the injection nebulizer 30 in operation. When the engine of the vehicle stops, the vibration sensor 264 does not detect vibration, and the control module 260 turns off the injection nebulizer 30.

According to another embodiment, the control module 260 can evaluate the fuel consumption to control the delivery rate of the material 40 as aerosol 50. One exemplary way to evaluate the fuel consumption is to monitor a fuel consumption computer of a vehicle or equipment. Another way is to use the pressure/vacuum sensor 270 in FIG. 2, which can be an airflow vane inserted into an intake air. According to yet another embodiment, the control module 260 can recognize high voltage or spikes (e.g., as high as 80 volts DC) to protect the control module 260 and the fuel combustion catalyst delivery device 200.

In another embodiment, the control module 260 can record the total time each receptacle or a bag) is used or consumed, the total time all of the receptacles or bags are used, the total time the injection nebulizer 30 has operated overall with all of the receptacles or bags, and the number of times receptacles or bags have been replaced. In another embodiment, the control module 260 can record the serial number of each of the receptacles or bags consumed or the time elapsed since the replacement warning signal has been issued or since the material 40 has been depleted. According to one aspect, the serial numbers may be tracked by a radio frequency ID tagging system. In another embodiment, the control module 260 retains the last count of the pulse applied to the piezoelectric device 837, and when the receptacle or the bag containing the material 40 is replaced, the control module 260 counts up from the last pulse count rather than resetting the pulse count.

In yet another embodiment, the control module 260 can immobilize or disable the fuel combustion catalyst delivery device 200 (e.g., the injection nebulizer 30 or the piezoelectric device 837) from further use when the material 40 has been consumed to prevent refilling or injecting with incorrect catalyst solutions. For example, the control module 260 can monitor the levels of the material 40. When the level of the material 40 goes from full to empty, the control module 260 can disable the injection nebulizer 30 (e.g., the piezoelectric device 837) so that it cannot be turned on again.

In another aspect, the control module 260 can disable the injection nebulizer 30 (e.g., the piezoelectric device 837) when the receptacle 827 is refilled after the material 40 has been consumed either partially or entirely. For example, if the level of the material 40 goes from full to ¼ full, and then it goes to ¾ full, then the control module 260 detects that the receptacle 827 has been refilled and disables the injection nebulizer 30 (e.g., the piezoelectric device 837). In yet another aspect, the control module 260 can disable the injection nebulizer 30 (e.g., the piezoelectric device 837) when the receptacle 827 is opened (e.g., unscrewed from the injection nebulizer 30) to prevent refilling or injecting with incorrect catalyst solutions.

According to one embodiment, the control module 260 is connected to a computer system of an engine or equipment to improve the regulation of the material 40, for example, by regulating the output of the material 40 according to the actual weight of fuel being consumed. According to yet another embodiment, the control module 260 may include a data port to change a program or read stored data.

According to one embodiment of the present invention, the fuel combustion catalyst delivery device 200 is portable and disposable. According to another aspect, the fuel combustion catalyst delivery device 200 is small enough to fit into an engine compartment of any size vehicle. It should be noted that an injection nebulizer is not limited to a piezoelectric device, a diaphragm and an injector plate and may employ other types of nebulizer that can convert a liquid to an aerosol and deliver the aerosol to an intake air.

According to another embodiment, when the fuel combustion catalyst delivery device 200 is placed in a rough environment such as an engine compartment of a vehicle (e.g., cars, trucks, airplanes, boats, motor cycles), a generator, pumps or construction equipment, the components of the fuel combustion catalyst delivery device 200 and the mounting bracket 240 need to be made in a manner to withstand the vibration. For example, the chamber 833 is securely attached to the receptacle 827 using screws/bolts. Various washers 822A, 822B, 824 and 836 ensure that the material 40 or the aerosol 50 does not leak. Various positioning and holding devices (e.g., the guide housing 838 and the assembly guide plate 823) are used to keep the components in place even when the fuel combustion catalyst delivery device 200 is in motion. The present invention is not limited to the exemplary positioning, tightening, separating and holding devices shown above and may employ other devices or structures.

While the present invention has been particularly described with reference to the various figures and embodiments, it should be understood that these are for illustration purposes only and should not be taken as limiting the scope of the invention. There may be many other ways to implement the invention. Many changes and modifications may be made to the invention, by one having ordinary skill in the art, without departing from the spirit and scope of the invention. For example, the components described with reference to FIGS. 1 through 5 may be replaced with other types of components. Some of the components may be eliminated, and some new components may be added in alternate embodiments. Furthermore, the component structures and shapes are not limited to those shown in FIGS. 1 through 5, and a variety of different structures and shapes may be employed.

What is claimed is:

1. A fuel combustion catalyst delivery apparatus comprising:
    a receptacle containing a material, the receptacle including surfaces exposed to the material, the receptacle for coupling to or coupled to an injection nebulizer,
    the injection nebulizer configured to convert the material to an aerosol and to inject the aerosol into an intake air of a combustion zone, the aerosol for modifying combustion, the injection nebulizer including surfaces for being exposed to the material or the aerosol, and
    a pressure regulator configured to provide a pressure level of the receptacle about equal to a pressure level of the intake air regardless of the pressure level of the intake air.

2. The fuel combustion catalyst delivery apparatus of claim 1, wherein the fuel combustion catalyst delivery apparatus is configured to prevent the material from leaking out of the fuel combustion catalyst delivery apparatus when the injection nebulizer is turned off regardless of the pressure level of the intake air.

3. The fuel combustion catalyst delivery apparatus of claim 1, wherein the fuel combustion catalyst delivery apparatus is configured to prevent the material from flowing back into the receptacle regardless of the pressure level of the intake air.

4. The fuel combustion catalyst delivery apparatus of claim 1, wherein the receptacle includes either a flexible bag containing the material or a baffling form containing the material.

5. The fuel combustion catalyst delivery apparatus of claim 1, wherein the pressure regulator includes a passage, and the receptacle includes at least a portion of the passage.

6. The fuel combustion catalyst delivery apparatus of claim 1, wherein the injection nebulizer includes an electronic device for controlling a delivery rate of the material to the intake air as the aerosol.

7. The fuel combustion catalyst delivery apparatus of claim 1, wherein at least a portion of the injection nebulizer is for being placed within an air intake duct.

8. The fuel combustion catalyst delivery apparatus of claim 1, wherein the material is at least one of the following: water, alcohol, kerosene, oil, glycol, organic acid and ester.

9. The fuel combustion catalyst delivery apparatus of claim 1, wherein the material includes one or more catalytic materials, and the one or more catalytic materials include one or more of the following metals or compounds thereof: platinum, rhodium, rhenium, palladium, ruthenium, iridium, gold, aluminum, cerium, molybdenum and tin.

10. The fuel combustion catalyst delivery apparatus of claim 1, wherein the material is acidic.

11. The fuel combustion catalyst delivery apparatus of claim 1, wherein the material further includes one or more of the following metals or compounds thereof: lithium, sodium, potassium, calcium and magnesium.

12. A fuel combustion catalyst delivery apparatus comprising:
    a receptacle containing a liquid,
    a vibration pump configured to convert the liquid to an aerosol to be delivered into an intake air of a combustion zone,
    a pressure equalizer configured to maintain a pressure level of the receptacle at about the same pressure level of the intake air of the combustion zone, and
    a liquid delivery device configured to deliver the liquid to the vibration pump.

13. The fuel combustion catalyst delivery apparatus of claim 12, wherein the vibration pump is configured to regulate a delivery rate of the liquid into the intake air as the aerosol based on the pressure level of the intake air.

14. The fuel combustion catalyst delivery apparatus of claim 12, wherein the vibration pump is configured to regulate a delivery rate of the liquid into the intake air as the aerosol, based on an actual fuel consumption rate in the combustion zone.

15. The fuel combustion catalyst delivery apparatus of claim 12 further including a pressure sensor for sensing the pressure level of the intake air of the combustion zone to allow regulation of a delivery rate of the liquid into the intake air as the aerosol based on the pressure level of the intake air.

16. The fuel combustion catalyst delivery apparatus of claim 12 further including an electronic control module for controlling the vibration pump.

17. The fuel combustion catalyst delivery apparatus of claim 12 further including a mounting bracket or a docking station.

18. The fuel combustion catalyst delivery apparatus of claim 12, wherein the vibration pump is for delivering the liquid as the aerosol at a rate of about 10 ml to 500 ml over about 500 hours of operation.

19. The fuel combustion catalyst delivery apparatus of claim 12, wherein the fuel combustion catalyst delivery device is configured to withstand vibration created in an engine compartment, a generator or equipment.

20. The fuel combustion catalyst delivery apparatus of claim 12, wherein components of the fuel combustion catalyst delivery apparatus exposed to the liquid or the aerosol or configured to be exposed to the liquid or the aerosol are made from one or more of a polymer, a corrosion-resistant metal or a material coated with an inert material.

21. The fuel combustion catalyst delivery apparatus of claim 12, wherein surfaces of or within the receptacle exposed to the liquid and surfaces of or within the vibration pump that are configured to be exposed to the liquid or the aerosol are capable of maintaining inertness for over 200 hours of operation of the vibration pump or for over 1000 hours of exposure to the liquid or the aerosol.

22. The fuel combustion catalyst delivery apparatus of claim 12, wherein surfaces of or within the receptacle exposed to the liquid and surfaces of or within the vibration pump that are configured to be exposed to the liquid or the aerosol are capable of producing substantially no contaminants into the liquid or the aerosol for over 200 hours of operation of the vibration pump or for over 1000 hours of exposure to the liquid or the aerosol.

23. The fuel combustion catalyst delivery apparatus of claim 12, wherein the material includes one or more catalytic materials.

24. The fuel combustion catalyst delivery apparatus of claim 1, wherein the nebulizer includes a piezoelectric device, and the piezoelectric device is for being operated at a pulse rate between 10 pulses per second to 100 pulses per second.

25. The fuel combustion catalyst delivery apparatus of claim 1, wherein the receptacle is made from one or more materials having a softening or deforming point above about 200° F., and wherein the nebulizer includes one or more components, and all of the one or more components of the nebulizer are made from one or more materials having a softening or deforming point above about 200° F.

26. The fuel combustion catalyst delivery apparatus of claim 1, wherein the receptacle is attached to the nebulizer, and the nebulizer is for being disabled to prevent the nebulizer from being operated using a refilled material or a different material.

27. The fuel combustion catalyst delivery apparatus of claim 1 further comprising: a control module for recognizing the level of the material remaining in the receptacle, wherein the receptacle is coupled to the nebulizer.

28. The fuel combustion catalyst delivery apparatus of claim 1 further comprising: a control module for monitoring vibration of a vehicle or equipment to determine whether combustion is occurring, the control module for allowing the nebulizer to operate while the vibration is detected and for turning off the nebulizer when the vibration is not detected.

29. The fuel combustion catalyst delivery apparatus of claim 1 further comprising: a control module for evaluating fuel consumption to control a delivery rate of the material as the aerosol.

30. The fuel combustion catalyst delivery apparatus of claim 1 further comprising: a control module for recording the total time the receptacle is used with the nebulizer and for recording the number of times receptacles or bags are replaced.

31. The fuel combustion catalyst delivery apparatus of claim 1, wherein the nebulizer is for being disabled when the material contained in the receptacle is consumed, wherein the nebulizer is coupled to the receptacle.

32. The fuel combustion catalyst delivery apparatus of claim 1, wherein the nebulizer is for being disabled when the receptacle is opened.

33. The fuel combustion catalyst delivery apparatus of claim 1 further comprising a control module for connecting to a computer system of a vehicle or equipment to regulate the amount of the aerosol to be delivered into the intake air.

34. The fuel combustion catalyst delivery apparatus of claim 1 for being placed after a turbo charger or a super-charger in an engine compartment.

35. A fuel combustion catalyst delivery apparatus of claim 1, wherein a pressure level of the intake air varies from below the atmospheric pressure level to above the atmospheric pressure level.

36. The fuel combustion catalyst delivery apparatus of claim 1 further comprising a quick disconnect coupler for quickly disconnecting the fuel combustion catalyst delivery apparatus from an air intake duct, wherein the receptacle is coupled to the nebulizer.

37. The fuel combustion catalyst delivery apparatus of claim 1 wherein the nebulizer includes at least an orifice.

38. The fuel combustion catalyst delivery apparatus of claim 37, wherein the orifice is configured to eject the aerosol from the nebulizer and to inject the aerosol into the intake air.

39. The fuel combustion catalyst delivery apparatus of claim 37, wherein the orifice is not greater than 20 μm in diameter.

40. A fuel combustion catalyst delivery apparatus comprising:
    a receptacle containing a material, the receptacle for coupling to or coupled to a nebulizer,
    the nebulizer configured to convert the material to an aerosol to be delivered into an intake air of a combustion zone, the nebulizer configured to control the amount of the aerosol being delivered into the intake air,
    a regulator to allow the aerosol to be delivered into the intake air of the combustion zone regardless of a pressure level of the intake air, wherein the nebulizer includes at least one orifice,
    a plate including the orifice,
    a diaphragm,
    a piezoelectric device, and
    a chamber, wherein the chamber contains the plate, the diaphragm and the piezoelectric device.

41. The fuel combustion catalyst delivery apparatus of claim 40, wherein the chamber has an opening for exposing the orifice to the intake air, wherein at least a first side of the plate and a first side of the diaphragm are for being exposed to the material.

42. A fuel combustion catalyst delivery apparatus comprising:
    a receptacle containing a material, the receptacle for coupling to or coupled to a nebulizer,
    the nebulizer configured to convert the material to an aerosol to be delivered into an intake air of a combustion zone, the nebulizer configured to control the amount of the aerosol being delivered into the intake air,
    a regulator to allow the aerosol to be delivered into the intake air of the combustion zone regardless of a pressure level of the intake air,
    a diaphragm,
    a wick and
    either a flexible bag or a baffling form containing the material,
    wherein a first portion of the wick is for delivering the material to the diaphragm, a second portion of the wick is in contact with the material and extends into either the flexible bag or the baffling form.

43. The fuel combustion catalyst delivery apparatus of claim 1, wherein the material includes one or more catalytic materials.

44. The fuel combustion catalyst delivery apparatus of claim 1, wherein components of the fuel combustion catalyst delivery apparatus exposed to or configured to be exposed to a fuel or fuel fume are made from one or more materials inert to the fuel and fuel fume.

45. A fuel combustion catalyst delivery apparatus comprising:
    a receptacle for coupling to or coupled to an injection nebulizer, the injection nebulizer configured to convert a material to an aerosol and to inject the aerosol into an intake air of a combustion zone, the aerosol for modifying combustion, the injection nebulizer including surfaces for being exposed to the material or the aerosol, and a pressure regulator configured to provide a pressure level of the receptacle about equal to a pressure level of the intake air regardless of the pressure level of the intake air.

* * * * *